United States Patent [19]
Oda et al.

[11] 3,864,146
[45] Feb. 4, 1975

[54] SENSITIZED RECORD SHEET MATERIAL

[75] Inventors: Shinichi Oda, Amagasaki; Jujiro Kono, Osaka, both of Japan

[73] Assignee: Kanzaki Paper Manufacturing Co., Ltd., Tokyo, Japan

[22] Filed: June 13, 1972

[21] Appl. No.: 262,362

[30] Foreign Application Priority Data
June 16, 1971 Japan................................ 46-43546

[52] U.S. Cl.............................. 117/36.8, 117/36.2
[51] Int. Cl............................................. B41m 5/22
[58] Field of Search........................ 117/36.2, 36.8

[56] References Cited
UNITED STATES PATENTS

| | | | |
|---|---|---|---|
| 2,981,738 | 3/1961 | Kranz.................... | 260/308 |
| 3,330,722 | 7/1967 | Amano et al. ........... | 117/36.2 |
| 3,483,013 | 12/1969 | Berg et al. .............. | 117/36.2 |
| 3,516,845 | 6/1970 | Brockett................. | 117/36.2 |
| 3,535,139 | 10/1970 | Watanabe et al......... | 117/36.2 |
| 3,732,120 | 5/1973 | Brockett et al.......... | 117/36.8 |

FOREIGN PATENTS OR APPLICATIONS 1,218,476  6/1966  Germany ........................... 117/36.2

*Primary Examiner*—Ralph Husack
*Attorney, Agent, or Firm*—Cushman, Darby & Cushman

[57] ABSTRACT

The sheet of record material is sensitized with an improved coating to produce color on contact with lactone chromogenic compounds. The coating comprising a binder and a color reactant material. The color reactant material essentially comprises in combination:

a. A metal ion of a metal selected from the group consisting of zinc, aluminum, calcium, magnesium, titanium, nickel, cobalt, manganese, iron, tin, chromium, copper and vanadium, or a water insoluble inorganic compound of a metal selected from said metal group, and b. An aromatic carboxylic acid derivative including as its major functional arrangement the molecular structure represented by any of the following formulae:

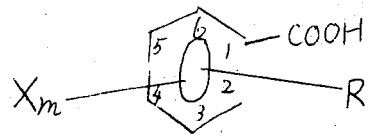

and

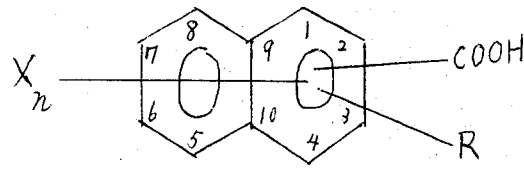

wherein R is hydroxyl, amino, amino substituted by at least one lower alkyl group having 1 to 5 carbon atoms, nitro or chlorine, which is substituted on one of the carbon atoms at the side adjacent to that of the carboxylic group on the aromatic ring, each X is a substituted or unsubstituted group containing a monocyclic or bicyclic carbon ring formed with 6 or 10 carbon atoms, $m$ is an integer of 1 to 2 and $n$ is an integer of 1 to 3.

15 Claims, No Drawings

SENSITIZED RECORD SHEET MATERIAL

BACKGROUND OF THE INVENTION

This invention relates to a sheet of record material sensitized with an improved oating to produce color on contact with chromogenic materials. coating Several types of pressure-sensitive recording systems are known utilizing an electron donor-acceptor color-forming reaction between basic dyes and color forming reactant acid materials. U.S. Pat. No. 2,730,456 discloses a transfer-copy system wherein minute oil droplets of a colorless dye intermediate, dispersed or dissolved in an oil, are encapsulated and coated onto a transfer sheet. The dye intermediate is thereafter transferred to a copy sheet by rupturing said capsules. The underlying copy sheet has a color reactant coating thereon containing a material which will react with the dye intermediate causing a visible colored mark at points where the microcapsules have been ruptured and the dye has been transferred.

U.S. Pat. No. 2,730,457 discloses another type of a pressure-sensitive record sheet. In this pressure-sensitive record sheet, there are disposed on one surface of the same sheet both the color reactant and the capsules containing oil droplets in which the dye intermediate is dissolved. This record material is known as a "self contained" system.

Japanese Pat. No. 511,757 (corresponding to German Pat. No. 1,275,550) discloses a further pressure-sensitive recording system. This system comprises disposing on and/or within a sheet support material unreacted mark-forming components (at least one of which is a polymeric material such as phenol-aldehyde resin) and a liquid solvent, in which each of mark-forming components is soluble, the liquid solvent being present in such a form that it is maintained isolated from at least one of the mark-forming components by a pressure-rupturable capsule thereabout.

This invention relates to an improvement of such pressure-sensitive recording systems as described above.

On the other hand, an organic acid material is known as a color-forming reactant in the art of pressure-sensitive record sheet. Among such materials, there are phenols as described in U.S. Pat. No. 3,244,500 and phenolic polymeric materials as described in U.S. Pat. No. 3,516,845 and Japanese Pat. No. 511,757. Although phenols and phenolic polymers exhibit good color formability when brought into contact with triphenyl methane dyes such as crystal violet lactone, the record sheets sensitized with such color reactants have inherent disadvantages in that the initially white record sheet is changed into yellow or yellowish brown under conditions of exposure to daylight and that the colored markings formed on the record sheets tend to be blurred or disappear by the effects of direct daylight, heat and high humidity. The color fomability of phenols will be reduced to a great extent formability a relatively short period of time even under the room temperature conditions since they are of high degree of sublimation. U.S. Pat. No. 3,488,207 teaches a process for preparing a colored substance by contacting a derivative of bis (p-dialkylaminoaryl) methane with one of the carboxylic acids, such as 3-hydroxy-2-naphthoic acid, 1-hydroxy-2-napthoic acid, 3-nitrophthalic acid, m-cresotic acid, p-cresotic acid, salicylic acid, 3-nitrosalicylic acid, m-nitrobenzoic acid, salicylic acid, 3-nitrosaliciclic acid, m-nitrobenzoic acid, glycolic acid, lactic acid, α-hydroxybutyric acid, α-hydroxydecanoic acid, malic acid, citric acid and tartaric acid. However, the record sheet sensitized with these carboxylic acids looses its color formability in a relatively short period of time because of its high degree of sublimation and the colored markings produced on such record sheet are unstable towards the effects of daylight, heat and high humidity.

The primary object of the invention is to provide a new and useful record sheet material sensitized with an improved coating to produce color on contact with chromogenic compounds, in which the above discussed disadvantages with conventional sensitized record materials can be avoided.

Another object of the invention is to provide a novel and useful record sheet material sensitized with color-forming reactant coatings, which has a good sensitivity to color reaction with known colorless dyes such as crystal violet lactone, benzoyl leucomethylene blue, malachite green lactone, rhodamine lactone, fluoran derivatives and the like.

A further object of the invention is to provide a novel and useful record sheet material sensitized with color-forming reactant coatings, in which colored images, once produced by color reaction with colorless dyes, are stable for a prolonged time against direct daylight, heat and humidity.

A still further object of the invention is to provide a new and improved process for manufacturing the record sheet material of such type as described in the above.

Other objects and advantages of the invention will be apparent from the following description.

SUMMARY OF THE INVENTION

The sheet of record material according to the invention is sensitized with a coating to produce color on contact with colorless chromogenic compounds. Such coating comprises a binder in an amount sufficient to adhere the coating to the base sheet and a color reactant material. The color material essentially comprises in combination:

a. At least one metal ion of a metal selected from the group consisting of zinc, aluminum, calcium, magnesium, titanium, nickel, cobalt, manganese, iron, tin, chromium, copper and vanadium, or at least one water insoluble inorganic compound of a metal selected from said metal group, and b. At least one aromatic carboxylic acid derivative including as its major functional arrangement the molecular structure represented by any of the following formulae:

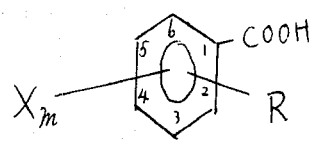

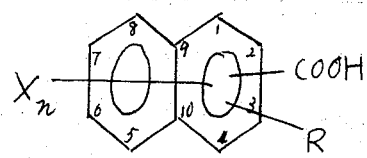

In the above formulae, R is hydroxyl, amino, amino substituted by at least one lower alkyl group having 1 to 5 carbon atoms, nitro or chlorine, which is substituted on one of the carbon atoms at the site adjacent to that of the carboxylic group on the aromatic ring, each X is substituted or unsubstituted group containing a monocylic or bicyclic carbon ring formed with 6 or 10 carbon atoms, $m$ is an integer of 1 or 2 and $n$ is an integer of 1 to 3.

It should be noted that in the above formulae further substituent groups may be present on the aromatic ring.

DETAILED DESCRIPTION OF THE INVENTION

One of the important aspects of the above mentioned aromatic carboxylic acid derivative of this invention is the fact that said substituent R is to be substituted on one of the carbon atoms adjacent to the carboxylic group on the aromatic ring. This molecular structure indicates that R is capable of forming with a carboxylic group a chelate ring which renders the present record sheet to have more active color forming reactivity with chromogenic materials. Another important aspect is that the substituted or unsubstituted substituent X containing mono or bicyclic carbon ring formed with 6 or 10 carbon atoms is to be substituted on at least one of the carbon atoms of the aromatic ring. More desirably, the substituent X is substituted on at least one of the carbon atoms adjacent to the substituent R. By the introduction of the substituent, the carboxylic acid derivatives described are substantially improved in their solubility in oily solvents, its resistivity to the effects of heat, water or high relative humidity and its degree of sublimation. When modified with certain metal ions or water-insoluble inorganic metallic compounds, the aromatic carboxylic acid derivatives provide color reactant materials having an extremely high color formability.

The aromatic carboxylic acid derivatives represented by the following general formula show, by way of examples, useful compounds having the above molecular structure as an effective major functional arrangement,

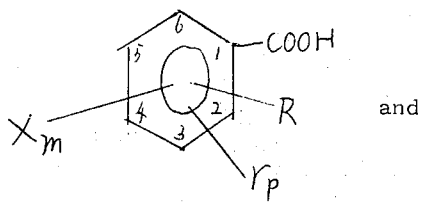 and 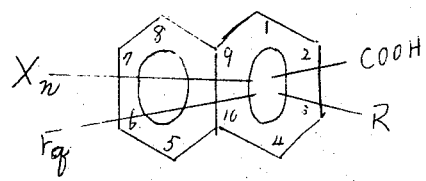

wherein each X represents phenyl, alkyl substituted by phenyl group, amino substituted by phenyl group, azo substituted by phenyl group, phenoxy, cyclohexyl, alkyl substituted by cyclohexyl group, naphthyl, alkyl substituted by naphthyl group, tetrahydro-naphthyl, alkyl substituted by tetrahydronaphthyl, decahydronaphthyl, alkyl substituted by decahydronaphthyl group, which may have at least one of further substituent as illustrated as each $r$ in the above general formula; $m$ representes in integer of 1 to 2; $n$ represents an integer of 1 to 3; each $r$ represents hydrogen, lower alkyl having 1 to 5 carbon atoms, allyl, halogen, cycloalkyl, hydroxyl, nitro, amino, amino substituted by $C_1-5$ lower alkyl group, carboxyl or its ester, alkoxy, sulfonic acid on its ester, alkyl substituted by halogen, substituted or unsubstituted benzoyl, phenyl, biphenyl, naphthyl, and alkyl substituted by aryl; $p$ is an integer of 1 to 3; $q$ is an integer of 1 to 5; R represents hydroxyl, amino, amino substituted by $C_1 - C_5$ lower alkyl group, nitro and chlorine, which are substituted on one of the carbon atoms adjacent to the carboxylic group on the aromatic ring.

Among the aromatic carboxylic acid derivatives represented in the above formulae there may be included the following compounds:

3-phenylsalicylic acid
2-chloro-5-phenylbenzoic acid
3-benzylsalicyclic acid
5-(4'-hydroxyphenyl)salicyclic acid
2-nitro-3-(2'-nitro-3'-carboxyphenyl)benzoic acid
5,5'-methylenedisalicyclic acid
2-nitro-3-(3'-carboxybenzyl)benzoic acid
3-methyl-5-phenylsalicylic acid
3-(4'-aminophenyl)-2-aminosalicylic acid
5-benzyl-6-aminosalicylic acid
3-methyl-5-benzylsalicylic acid
2,6-dihydroxy-3-($\beta$-phenethyl)benzoic acid
2-nitro-5-(4'-methoxystilben)benzoic acid
2-nitro-6-(4'-methylbenzoyl)benzoic acid
3-(4'-chlorobenzyl)-5-(tert-bytyl)salicylic acid
3-benzyl-5-(2,2'-dimethyl-iso-prophy)salicylic acid
3-(tert-butyl)-5-[p-(tert-butyl)benzyl]salicylic acid
3-cyclohexyl-5-($\alpha,\alpha$-dimethylbenzyl)salicylic acid
4-phenyl-5-benzoylsalicylic acid
3,5-di-($\alpha,\alpha$-dimethylbenzyl)salicylic acid 3-[4'-($\alpha,\alpha$-dimethylbenzyl)-phenyl]-5-($\alpha,\alpha$-dimethylbenzyl)-salicylic acid
2-nitro-3-[4'-($\alpha,\alpha$-dimethylbenzyl)-phenyl]benzoic acid
3-phenyl-5-[4'-($\alpha,\alpha$-dimethylbenzyl)-$\alpha,\alpha$-dimethylbenzyl]salicylic acid
5-(4'-ethoxycarbonylphenyl)salicylic acid
4-(3'-carboxy-4'-hydroxyphenyl)benzenesulfonic acid
3-phenyl-5-($\alpha,\alpha$-dimethylbenzyl)salicylic acid
3-phenyl-5-hydroxysalicylic acid
4-(5'-methylnaphtyl)salicylic acid
2-hydroxy-1-benzyl-3-naphthoic acid
3,3'-dicarboxy-2,2'-dihydroxy-1,1'-dinaphthylmethane
1-benzoyl-2-hydroxy-3-naphthoic acid
1-chloro-4'-hydroxy-dinaphthylketone-3'-carboxylic acid
1,4-di(dimethylamino)-3-phenyl-2-naphthoic acid
2-hydroxy-5-[4'-(tert-buthyl)phenyl]-1-naphthoic acid
3-hydroxy-5-cyclohexyl-2-naphthoic acid
3-hydroxy-4-(2'-hydroxy-3'-carboxyphenyl)-2-naphthoic acid Of the above compounds, 3,5-di-($\alpha, \alpha$-dimethylbenzyl) salicylic acid, 3-[4'-($\alpha, \alpha$-dimethylbenzyl)-phenyl]-5-($\alpha, \alpha$-dimethylbenzyl) salicylic acid, 3-cyclohexyl-5-($\alpha,\alpha$-dimethylbenzyl) salicylic acid, 3-phenyl-5-[4'-($\alpha, \alpha$-dimethylbenzyl)-$\alpha, \alpha$-dimethylbenzyl] salicylic acid, and 3-phenyl-5-($\alpha, \alpha$-dimethylbenzyl) salicylic acid would be most preferred.

It was found that the aforementioned aromatic carboxylic acid derivatives, per se, do not provide practical color-forming reactant materials because of their very slight activity to the colorless chromogenic materials but they can be highly sensitive color-forming reactant materials when they are combined with certain metal ions or certain water-insoluble inorganic metallic compounds. In a preferred embodiment of the invention, the color reactant material essentially comprises a mixture of the aromatic carboxylic acid derivatives described and one or more of oxides, hydroxides and carbonates of a metal selected from the group consisting of zinc, aluminum, calcium, magnesium, titanium, nickel, cobalt, manganese, iron, tin, chromium, copper and vanadium. Among suitable inorganic metallic compounds there may be included zinc oxide, aluminum oxide, calcium oxide, magnesium oxide, titanium oxide, zinc hydroxide, aluminum hydroxide, calcium hydroxide, zinc carbonate, calcium carbonate and magnesium hydroxide. These inorganic metallic compounds are water insoluble, per se, exhibit no substantial color forming reaction even when brought into contact with the chromagenic materials. According to the invention, the mixing ratio by weight of the aromatic carboxylic acid derivative or derivatives to the above mentioned inorganic metallic compound or compounds is selected within the range of 95:5 to 5:95. More preferably, in order to obtain the sensitized record sheet having a high color forming ability, high printability and a low production cost, 15 to 25 parts by weight of the aromatic carboxylic acid derivative may be mixed with 85 to 75 parts by weight of the inorganic compound described. A part of the inorganic metallic compound may be replaced by other inorganic pigments such as kaoline, clay and talc.

In another embodiment of the invention, which is believed most preferable, the color-forming reactant material of this invention comprises a compound of the aromatic carboxylic acid derivative and a metal selected from the group consisting of zinc, aluminum, calcium, magnesium, titanium, nickel, cobalt, manganese, iron, tin, chromium, copper and vanadium. The metallic compounds may be any of salts, complex salts and chelate compounds. The metallic compounds described provides a color reactant material having more improved color forming ability than in the case of a mixture of the aromatic carboxylic acid derivative with the inorganic metallic compound. In other words, the above defined organic metallic compounds, per se, have an excellent color forming ability on contact with the chromogenic materials and show an extremely efficient color reaction when brought into contact with the chromogenic materials such as crystal violet lactone, benzoyl leucomethylene blue etc. Also, the metallic compounds described show an improved resistance against direct sunlight, heat and water or high humidity and do not volatilize at high temperatures of, for example, even at 200°C. Therefore, the record sheet which is sensitized by such a metallic compound and the colored markings which are produced on the sensitized sheet are both stable for a prolonged period of time towards the effects of direct sunlight, heat and water or high humidity. The above color-forming reactant comprising metallic compounds of the aromatic carboxylic acid derivatives may additionally contain a water-insoluble inorganic particulated material. In this case, the inorganic particulated material is not required to participate in a color forming reaction with the chromogenic material and may be oxides, hydroxides and carbonates of the aforementioned metals, kaolin, clay, talc and etc. The metallic compound of the aromatic carboxylic acid derivative may be mixed with inorganic particulated material in the weight ratio within the range of 95:5 to 5:95. In a preferred embodiment of the invention, in order to obtain a higher color forming ability, higher printability and to achieve lower production cost, the metallic compound of the aromatic carboxylic acid derivative may be suitably mixed with the inorganic particulated material in the weight ratio within the range of 15:85 to 30:70.

The color-forming reactants of this invention, as mentioned above are deposited on the surface of a base sheet with a binder or adhesives in an amount sufficient to adhere them to the base sheet. Among suitable binders or adhesives there are casein, starch, gelatin, carboxymethylcellulose, resinous materials, synthetic resin latexes and mixtures thereof. However, it is preferred that all or greater portion of the adhesives is comprised of carboxylated latexes. Such latexes give a strong adhesiveness with only a small quantity and ensure a good stability of the coating composition of this invention.

Among latexes useful for the invention and commercially available, there may be mentioned Dow 636 (latex of carboxylated styrene-butadiene copolymer, manufactured by Asahi Dow Co., Ltd., Japan), Polylac ML-707 (latex of carboxylated methylmethacrylate-butadiene copolymer, manufactured by Mitsui Toatsu Co., Japan) and SEBIAN-A 523 (latex of vinylacetate-crotonic acid copolymer, manufactured by DAICEL Ltd., Japan).

In the production of the sensitized sheet according to this invention, although paper is preferably used as a base sheet in view of low cost and easy to convert, plastic films or synthetic fiber papers may also be employed. The base sheet is impregnated or coated with a coating color containing adhesives and a color-forming reactant material. The coating color may be used in the form of either an aqueous system or non-aqueous system i.e. an organic solvent system. In general, the non-aqueous system is suitable for use in printing process, while the aqueous system is suitable for mass production on machine, and is more preferable than the non-aqueous system from the view points of economy, handling and safety. In the aqueous system, the aromatic carboxylic acid derivative or its metallic compound is dissolved or dispersed in the coating composition. In order to avoid an excessive penetration into the base sheet, the aromatic carboxylic acid derivative or its metallic compound may preferably be dispersed in a coating composition in the form of fine solid particles each having as small size as possible. Pulverization of the aromatic carboxylic acid derivatives or its metallic compound using conventional mechanical means such as a ball mill has a decisive limitation in view of the attainable pulverization degree i.e. the size of the pulverized particles. Thus, the present invention also provides an improved process for the preparation of the coating in which the aromatic carboxylic acid derivative or its metallic compound is first dissolved in an alkaline aqueous solution such as caustic soda, ammonia water etc. and a pH regulator such as acetic acid, hydrochloric acid, sulfuric acid, zinc sulfate, zinc acetate, aluminum chloride, ammonium chloride, calcium chloride, magnesium acetate etc. is then added into the alkaline aqueous solution to produce a deposition of the aromatic carboxylic acid derivative or its metallic compound in the form of extra-fine solid particles. If a water-insoluble inorganic particulate material such as oxides, hydroxides and carbonates of the aforesaid metals, kaolin, clay and talc is added to the sytem prior to the addition of the pH regulator, the fine particles of the aromatic carboxylic acid derivative or its metallic compound are deposited on the surface of such inorganic particulate substance.

The color reactant materials according to the invention can be used for color reaction with various known colorless dyes such as lactone dyes, e.g. crystal violet lactone, malachite green lactone and rhodamine lactone, methylene blue dyes, e.g. benzoyl leucomethylene blue, acryl leucomethylene blue and fluoran derivatives, e.g. 3-diethylamino-7-benzylaminofluoran, 3-diethylamino-7-aminofluoran, 3,7-bis-diethylaminofluoran, and the like.

As can be understood from the foregoing description, the sensitized sheet of the record material according to this invention has a number of advantages. For example, the sensitized record sheet of this invention neither loses its color formability on contact with the chromogenic compounds for a prolonged period of time nor changes its color under the effect of direct daylight. The sensitized sheet of this invention produces deep color images when brought into contact with chromogenic compounds due to the fact that the aromatic carboxylic compounds and their metallic compounds have a high solublity into the oily solvent. The color images thus produced in the sensitized sheet are highly stable towards the effects of direct daylight, ultra-violet radiation, heat and high humidity. Moreover, by employing the color reactant materials according to this invention, the amount of the color reactant required to produce the record sheet of the desired color formability can be reduced to an amount 90 to 40% smaller than when conventionally known color reactants comprised of such inorganic acid materials as acid clay, activated clay and attapulgite are used.

DETAILED DESCRIPTION OF THE PREFERRED EMBODIMENT

The following examples serve to illustrate the invention in more detail although the invention is not limited to the examples. Unless otherwise indicated, the amounts of the components are designated in parts by weight.

EXAMPLE 1

40 grams of 3-[4'-(α,α-dimethylbenzyl)phenyl] salicylic acid was dissolved in 200 grams of 2.5% ammonia water to form a solution. 100 grams of 30% clay slurry was suspended into the above solution with vigorous stirring. Then a solution of 10% hydrochloric acid was added into this suspension with continuous stirring so that the pH was adjusted at about 6.0. At this stage, said 3-[4'(α,α-dimethylbenzyl) phenyl] salicylic acid was deposited around the surface of said clay particles. 30 grams of zinc oxide was then suspended into the system with stirring, and subsequently, 30 grams of 10% solution of polyvinyl alcohol having a polymerization degree of 1000, and a hydrolyzation degree of 98% and 40 grams of Dow 620(carboxylated styrene-butadiene copolymer latex having a solid content of 50% and manufactured by Asahi Dow Chemical Co., Ltd., Japan) were added into the system. The resulting coating color was applied on one surface of a base paper of 60 grams per square meter (GSM) by the weight of 5 GSM on dry basis.

EXAMPLE 2

60 grams of 3-phenyl-5-benzyl salicylic acid and 35 grams of zinc oxide were ground by ball-milling for 3 hours with 400 grams of ethyl alcohol to form a mixture. Then, 20 grams of butyral resin was dissolved in the mixture. Coating color of ink type was obtained. This ink was printed on one surface of a base paper of 60 GSM by the weight of 5 GSM on dry basis, using a suitable painter.

EXAMPLE 3

40 grams of 3-phenyl salicylic acid was dissolved in 200 grams of 2.5% ammonia water to form a solution. A solution of 10% hydrochloric acid was added into the above solution with continuous stirring to cause deposition of fine particles of said 3-phenyl salicylic acid. At this stage, the pH of the system was approximately 6.0. Then, 80 grams of zinc oxide was suspended into the system together with 50 grams of 2% AG gum (cellulose ether, manufactured by DAIICHI KOGYO SEIYAKU CO., LTD. Japan), 30 grams of Dow 636 (carboxylated styrene-butadiene copolymer latex, having a solid content of 50%, manufactured by Asahi Dow Chemical Co., Ltd., Japan) and 50 grams of water. The resulting coating color was coated on one surface of a base paper of 60 GSM by the weight of 4 GSM on dry basis.

EXAMPLE 4

30 grams of 4-(5'-methylnaphtyl) salicylic acid was dissolved in 300 grams of a 1% NaOH solution. 70 grams of zinc oxide was suspended into the 4-(5'-methylnaphthyl) salicylic acid solution with stirring. Then a solution of 10% hydrochloric acid was added into the above suspension with continuous stirring to adjust the pH at about 6.2. At this stage, the salicylic acid derivative was found deposited around the surface of zinc oxide particles. Subsequently, 40 grams of 20% Nylgum A-200 (starch phosphated, manufactured by W. A. Scholten's Chemishe Febrieken N.V.) and 30 grams of Dow 636 latex were added into the system. The coating composition thus obtained was coated on one surface of a base paper in the same manner as Example 1.

The following examples are made using much the same procedures as those employed in Example 1 with different coating formulations.

EXAMPLE 5

| | |
|---|---|
| 3-phenyl-5-(α,α-dimethylbenzyl) salicylic acid | 15 |
| zinc oxide | 20 |
| clay | 65 |
| Nylgum A-220 | 8 |
| SN-304 (carboxylated styrene-butadiene copolymer latex having a solid content of 50%, manufactured by SUMITOMO NAUGATEX CO., Ltd., Japan) | 13 |

EXAMPLE 6

| | |
|---|---|
| 2-hydroxy-1-benzyl-3-naphthoic acid | 10 |
| 3-phenyl salicylic acid | 10 |
| zinc oxide | 50 |
| calcium carbonate | 30 |
| AG gum | 1 |
| Dow 636 | 20 |

EXAMPLE 7

| | |
|---|---|
| 3-phenyl-5-{4'-(α,α-dimethylbenzyl)-α,α-dimethylbenzyl} Salicylic acid | 5 |
| 2-hydroxy-5-{4'-(tert-butyl) phenyl}-1-naphthoic acid | 5 |
| calcium carbonate | 40 |
| aluminum hydroxide | 30 |
| kaolin | 20 |
| Carboxymethylcellulose | 2 |
| Dow 620 | 15 |

| | |
|---|---|
| 3-phenyl-5- 4'-(α,α-dimethylbenzyl)-α,α-dimethylbenzyl Salicylic acid | 5 |
| 2-hydroxy-5- 4'-(tert-butyl) phenyl -1-naphthoic acid | 5 |
| calcium carbonate | 40 |
| aluminum hydroxide | 30 |
| kaolin | 20 |
| Carboxymethylcellulose | 2 |
| Dow 620 | 15 |

EXAMPLE 8

50 grams of 3-[4'-(α,α-dimethylbenzyl) phenyl]-5-(α,α-dimethylbenzyl) salicylic acid was suspended into 250 grams of water with 5 grams of 40% anionic surfactant. 65 grams of clay and 20 grams of zinc oxide were then added to the suspension. 100 grams of 8% Nylgum A-220 solution, as a stabilizer and adhesives, and 25 grams of SN-304 latex as an adhesive were also added to the suspension in order to obtain a coating color. The resulting coating color was coated on a base sheet in the same manner in Example 1.

EXAMPLE 9

50 grams of 3-phenyl-5-(α,α-dimethylbenzyl) salicylic acid was dissolved in 400 grams of 2.5% aqueous NaOH solution. 136 grams of 26.5% aqueous zinc sulfate solution was slowly added to this solution with continuous stirring resulting in the precipitation of a zinc compound of 3-phenyl-5-(α,α-dimethylbenzyl) salicylic acid. At this stage, the pH of the system was about 7.3. 25 grams of 2% aqueous AG gum solution and 25 grams of SN-304 latex were added to the obove system. The resulting coating color was applied to a base sheet in the same manner as Example 1.

EXAMPLE 10

This example is similar to Example 9 except that an aqueous solution of 3-phenyl-5-(α,α-dimethylbenzyl) salicylic acid was added to an aqueous solution of zinc sulfate instead of suspending 3-[4'-(α,α-dimethylbenzyl) phenyl]-5-(α,α-dimethylbenzyl) salicylic acid into water with a surfactant. The resulting coating color was applied to a base sheet in the same manner as Example 1.

EXAMPLE 11

20 grams of 3-[4'-(α,α-dimethylbenzyl) phenyl]-5-(α, α-dimethylbenzyl) salicylic acid was dissolved in 300 grams of 2% aqueous NaOH solution. Then 80 grams of calcium carbonate was suspended into the solution with continuous stirring, to which 110 grams of 10% aqueous zinc sulfate solution was added with vigorous stirring. The zinc compound of 3-[4'-(α, α-dimethylbenzyl)]-5-(α,α-dimethylbenzyl) salicylic acid was found deposited around the surface of the particles of calcium carbonate. In this stage, the pH of this system was about 7.0. Then, 20 grams of 20% aqueous Nylgum A-220 solution and 40 grams of Dow 620 latex were added to the system. The sensitized recording sheet was obtained in the same manner as Example 1.

EXAMPLE 12

This example is similar to Example 11 except that calcium carbonate was added after the addition of zinc sulfate solution.

EXAMPLE 13

70 grams of a zinc compound of 3,5-di(α,α-dimethylbenzyl) salicylic acid added into 300 grams of water with anionic surfactant as a dispersing agent, to which 30 grams of zinc oxide was added with vigorous stirring. Then, 100 grams of 10% solution polyvinyl alcohol having a polymerization degree of 1700, and a hydrolyzation degree of 98% was added. The sensitized recording sheet was obtained in the same manner as Example 1.

EXAMPLE 14

40 grams of an aluminum compound of 1-hydroxy-5-phenyl-2-naphthoic acid was dissolved in 400 grams of 2% NaOH aqueous solution. 40 grams of kaolin was suspended into the solution, and the pH of which was adjusted at about 6.3 by the addition of 10% acetic acid solution. At this stage, the aluminum compound was found deposited arround the surface of the kaolin particles. 100 grams of 2% carboxymethylcellulose solution and 50 grams of Dow 620 latex were added to the system. The sensitized was obtained in the same manner as Example 1.

EXAMPLE 15

200 grams of a zinc compound of 2-hydroxy-1-benzyl-3-naphthoic acid was dissolved in 300 grams of 2.5% NaOH aqueous solution. 80 grams of clay was suspended into the solution, with the following pH adjustment of the system at about 7.2 by the addition of 10% zinc acetate solution. Consequently, the zinc compound of 2-hydroxy-1-benzyl-3-naphthoic acid was found deposited arround the surface of the clay particles. 40 grams of 20% Nylgum A-220 aqueous solution and 20 grams of Dow 620 were added. The sensitized sheet was obtained in the same manner as Example 1.

COMPARATIVE EXAMPLES

For comparative purposes, the coating colors having the following formulation, respectively, were coated on one surface of a base paper of 60 GSM by the weight of 5 GSM on dry basis.

| | |
|---|---|
| a) phenol-formaldehyde resin | 50* |
| calcium carbonate | 50 |
| polyvinyl alcohol | 5 |
| b) α-naphthol | 50 |
| calcium carbonate | 50 |
| polyvinyl alcohol | 5 |
| c) salicylic acid | 50 |
| calcium carbonate | 50 |
| polyvinyl alcohol | 5 |

*Parts by weight on dry basis

| | |
|---|---|
| a) phenol-formaldehyde resin | 50* |
| calcium carbonate | 50 |
| polyvinyl alcohol | 5 |
| b) α-naphthol | 50 |
| calcium carbonate | 50 |
| polyvinyl alcohol | 5 |

-Continued

| c) salicylic acid | 50 |
|---|---|
| calcium carbonate | 50 |
| polyvinyl alcohol | 5 |

*Parts by weight on dry basis

Some of sensitized sheets which were obtained in the above examples and comparative examples were heated at 100°C for 5 hours, and others were exposed to direct sunlight for 5 hours. As a result, it proved that the white color of the sheets in the comparative examples (a) and (b) changed into yellow or yellowish brown, while no appreciable change in color had been observed in the record sheets of the examples of the invention. On the other hand, the above heated or exposed sample sheets were superposed on the transfer sheets which were coated with capsules of oil droplets having crystals violet lactone dissolved therein and pressures was applied thereto by writing.

The dark color images were produced on the record sheets of this invention in the same pattern as the applied pressure. While on the other hand, no appreciable color images were obtained in the record sheets of the comparative examples (b) and (c).

Different tests were conducted on different record sheets obtained in the examples of this invention and the comparative examples. The sample sheets were first superimposed on the transfer sheet as mentioned and pressure was applied thereto by writing. The blue color images were immediately produced on each sensitized record sheet. The color images having particularly excellent darkness and clearness were appreciated in the record sheets of Example 8, 9 and 11. The record sheets having color images thereon were put to the tests for finding water resistance by wetting the sheets with water, moisture resistance by exposing the sheets at a relatively humidity of 90% and a temperature of 50°C for 72 hours, fade resistance by exposing the sheets to direct sunlight for 5 hours and heat resistance by exposing the sheets to an elevated temperature of 100°C for 5 hours.

As the result, no substantial change of color images was found in the record sheets of the examples of this invention, while the color images on the second sheets of the comparative examples were faded and their color deepness was also reduced to a great extent. Moreover, the color images on the record sheet of the comparative examples (b) and (c) were spread or blurred under the effects of water and high relative humidity.

What we claim is:

1. A sheet of record material sensitized with a coating to produce color on contact with colorless chromogenic compounds, said coating comprising a binder, and a color reactant material, said color reactant material consisting essentially of in combination:

a. at least one metal ion selected from the group consisting of zinc, aluminum, calcium, magnesium, titanium, nickel, cobalt, manganese, iron, tin, chromium, copper and vanadium, or at least one water insoluble inorganic compound of a metal selected from said metal group, and
   b. at least one aromatic carboxylic acid of the formula:

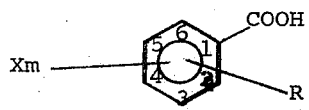 or [and] 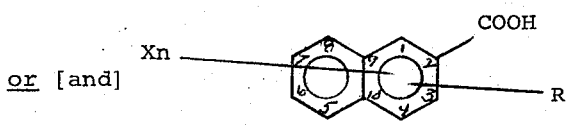

wherein R is hydroxyl, amino, amino substituted by at least one lower alkyl group having 1 to 5 carbon atoms, nitro or chlorine, and R Group being substituted on one of the carbon atoms at the position adjacent to that of the carboxylic group on the aromatic ring, X is a substituted or unsubstituted hydrocarbon containing a monocylic or bicylic carbon ring having 6 or 10 carbon atoms, $m$ is an integer of 1 to 2 and $n$ is an integer of 1 to 3.

2. The sheet of record material as claimed in claim 1 in which said X is substituted on the carbon atom at the position adjacent to that of said R.

3. The sheet of record material as claimed in claim 1, in which said aromatic carboxylic acid has the formula:

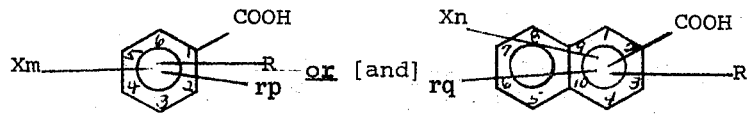

wherein X is phenyl, alkyl substituted by phenyl, amino subsituted by phenyl, azo substituted by phenyl, phenoxy, cyclohexyl, alkyl substituted by cyclohexyl, naphthyl, alkyl substituted by naphthyl, tetrahydronaphthyl, alkyl substituted by tetrahydronaphthyl, decahydronaphthlyl, or alkyl substituted by decahydronaphthyl, and may have at least one substituent group which is represented by each $r$ in said formulae, $m$ is an integer of 1 or 2, $n$ is an integer of 1 to 3, each $r$ is hydrogen, lower aliphatic alkyl, allyl, halogen, cycloalkyl, hydroxyl, nitro, amino, amino substituted by at least one lower alkyl having 1 to 5 carbon atoms, carboxyl, carboxylic ester, alkoxy, sulfonic acid, sulfonic ester, alkyl substituted by halogen, substituted or unsubstituted benzoyl, substituted or unsubstituted phenyl, substituted or unsubstituted biphenyl, substituted or unsubstituted naphthyl, or an alkyl substituted by aryl, $p$ is an integer of 1 to 3, $q$ is an integer of 1 to 5, and R is hydroxyl, amino, amino substituted by at least one lower alkyl having 1 to 5 carbon atoms, nitro or chlorine and is substituted on one of the carbon atoms at the position adjacent to that of the carboxyl group of the carbon ring.

4. The sheet of record material as claimed in claim 3, in which said X is substituted on the carbon atom at the position adjacent to that of said R.

5. A sheet of record material sensitized with a coating to produce color on contact with colorless chromogenous compounds, said coating comprising a binder, and a color reactant material, said color reactant material consisting essentially of a compound of
 a. a metal ion selected from the group consisting of zinc, aluminum, calcium, magnesium, titanium, nickel, cobalt, manganese, iron, tin, chromium, copper and vanadium, in combination with
 b. at least one aromatic carboxylic acid of the formula:

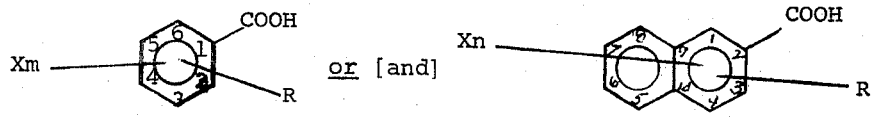

wherein R is hydroxyl, amino, amino substituted by at least one lower alkyl group having 1 to 5 carbon atoms, nitro or chlorine, and R group being substituted on one of the carbon atoms at the position adjacent to that of the carboxylic group on the aromatic ring, X is a substituted or unsubstituted group containing a monocyclic or bicylic carbon ring having 6 or 10 carbon atoms, $m$ is an integer of 1 or 2 and $n$ is an integer of 1 to 3.

6. The sheet of record material as claimed in claim 5, in which said coating further includes water insoluble inorganic particulate material.

7. The sheet of record material as claimed in claim 6, wherein said water insoluble inorganic particulate material is contained in said coating in an amount such that the ratio of said material to said metal compound of said aromatic carboxylic acid is within the range of 95:5 to 5:95.

8. The sheet of record material as claimed in claim 6, wherein said water insoluble inorganic particulate material is contained in said coating in an amount such that the ratio of said material to said metal compound of aromatic carboxylic acid is within the range of 85:15 to 70:30.

9. The sheet of record material as claimed in claim 6, wherein said water insoluble inorganic particulate material is zinc oxide.

10. The sheet of record material as claimed in claim 6, wherein said water insoluble inorganic particulate material is a mixture of zinc oxide with another water insoluble inorganic particulate material.

11. A sheet of record material sensitized with a coating to produce color on contact with colorless chromogenic compounds, said coating comprising a binder, and a color reactant material, said color reactant material consisting essentially of a mixture of
 a. at least one water insoluble inorganic compound of a metal selected from the group consisting of zinc, aluminum, calcium, magnesium, titanium, nickel, cobalt, manganese, iron, tin and chromium, in combination with
 b. at least one aromatic carboxylic acid of the formula:

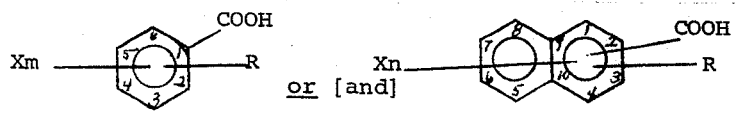

wherein R is hydroxyl, amino, amino substituted by at least one lower alkyl group having 1 to 5 carbon atoms, nitro or chlorine, said R group being substituted on one of the carbon atoms at the position adjacent to that of the carboxylic group on the aromatic ring, X is a substituted or unsubstituted group containing a monocyclic or bicyclic carbon ring formed with 6 or 10 atoms, $m$ is an integer of 1 or 2 and $n$ is an integer of 1 to 3.

12. The sheet of record material as claimed in claim 11, in which the ratio of said inorganic metal compound to said aromatic carboxylic acid is within the range of 5:95 to 95:5 by weight.

13. The sheet of record material as claimed in claim 11, wherein said coating further includes kaolin, clay, talc, and mixtures thereof.

14. A sheet of record material sensitized with a coating thereon to produce color on contact with a colorless chromogenous compounds, said coating comprising a binder, and a color reactant material, said color reactant material consisting essentially of, in combination:
 a. a metal ion selected from the group consisting of zinc, aluminum, calcium, magnesium, titanium, nickel, cobalt, manganese, iron, tin, chromium, copper and vanadium, or a water insoluble inorganic compound thereof, and
 b. at least one aromatic carboxylic acid of the formula:

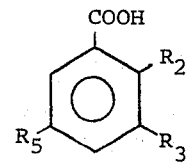

wherein $R_2$ is hydroxyl and $R_3$ and $R_5$ are independently cyclohexyl, phenyl, alkyl substituted by phenyl optionally further substituted by phenylalkyl, and alkyl having from 1 to 5 carbon atoms or phenyl substituted by phenylalkyl.

15. The sheet of record material as claimed in claim 14 wherein said aromatic carboxylic acid is selected from the group consisting of 3,5-di-($\alpha,\alpha$-dimethylbenzyl) salicylic acid; 3-[4'-($\alpha,\alpha$-dimethylbenzyl)-phenyl]-5-($\alpha,\alpha$-dimethylbenzyl) salicylic acid; 3-cyclohexyl-5-($\alpha,\alpha$-dimethylbenzyl) salicyclic acid; 3-phenyl-5-[4'-($\alpha,\alpha$-dimethylbenzyl)-$\alpha,\alpha$-dimethylbenzyl] salicylic acid; and 3-phenyl-5-($\alpha,\alpha$-dimethylbenzyl) salicylic acid.

* * * * *